US005921696A

United States Patent [19]

Gillotti

[11] Patent Number: 5,921,696

[45] Date of Patent: Jul. 13, 1999

[54] ADJUSTABLE MASSAGE CHAIR

[76] Inventor: Michael Gillotti, 6979 Baker La., Sebastopol, Calif. 95472

[21] Appl. No.: 09/016,858

[22] Filed: Jan. 30, 1998

Related U.S. Application Data

[62] Division of application No. 08/768,862, Dec. 17, 1996, Pat. No. 5,762,402.

[51] Int. Cl.[6] .......... F16B 7/10

[52] U.S. Cl. .......... 403/109.1; 403/110; 403/374.5; 297/463.1; 285/312; 24/270; 24/285

[58] Field of Search .......... 297/463.1, 463.2; 285/312, 358, 409; 403/110, 374.5, 109.1; 24/270, 285, 273; 248/222.13; 269/268, 269, 270

[56] References Cited

U.S. PATENT DOCUMENTS

| | | | |
|---|---|---|---|
| 249,766 | 11/1881 | Hunt | 285/358 |
| 1,058,255 | 4/1913 | Parker et al. | 285/312 |
| 2,038,766 | 4/1936 | Simmons | 285/358 |
| 2,371,375 | 3/1945 | Bird | 285/358 |

*Primary Examiner*—Peter M. Cuomo
*Assistant Examiner*—Anthony D. Barfield
*Attorney, Agent, or Firm*—Jack Lo

[57] ABSTRACT

An adjustable massage chair includes a chest support and a seat hingeably mounted to the outer ends of front and rear arcuate arms, respectively, that telescopically extend out the front and rear ends, respectively, of a stationary arcuate arm. A pair of clamps attached to the ends of the stationary arcuate arm lock the front and rear arcuate arms in their selected positions. A face support is hingeably attached to the top edge of the chest support, and is pivotable and movable fore-and-aft relative to the plane of the chest support. An arm support is hingeably attached to the lower side of the chest support, and is also slidably adjustable relative thereto. The face and chest supports are also slidably adjustable together relative to the end of the front arcuate arm. A pair of locking arms attached to the chest support lock it a selected position. A leg support is positioned between the chest support and the stationary arcuate arm. The hinged supports are all independently adjustable in tilt. Thus the present massage chair includes a multitude of adjustments for fitting different users, and for supporting them in a variety of positions for receiving a massage.

3 Claims, 7 Drawing Sheets

ADJUSTABLE MASSAGE CHAIR

CROSS REFERENCE TO RELATED APPLICATIONS

This is a division of application Ser. No. 08/768,862; filed Dec. 17, 1996 now U.S. Pat. No. 5,762,402.

BACKGROUND OF THE INVENTION

1. Field of the Invention

This invention relates generally to chairs, specifically to a highly adjustable massage chair.

2. Prior Art

A massage chair is a specially constructed chair on which a person sits for receiving a massage. A typical massage chair includes a seat for supporting a person's buttocks, a leg support positioned forwardly and below the seat for supporting the lower legs in a bent position, a chest support positioned forwardly and above the seat for supporting the chest in a forwardly inclined position, a face support positioned above and generally inline with the chest support for supporting the face, and an arm support positioned forwardly and below the chest support for supporting the arms in front of the chest.

Most massage chairs are foldable for transportation to a client's location for an on-site massage, so that they incorporate hinges on the supports for folding. Most supports are not adjustable in angle or height, so that they merely unfold into a single, open position. Although some chairs have seats that are adjustable in height, most have chest supports that are not height adjustable. Examples of such chairs include the "SomaChair" and "TechLight" by SomaTech International; the "Nomad" by Custom Craftworks; the "Golden Ratio Seven Point Quicklite Chair" by Golden Ration Woodworks; the "Pak-A-Chair" by G&A Manufacturers; the "On-Site D'Lite" by Stronglite; the "EasyChair" by Blue Ridge Tables, Inc. and TouchAmerica, Inc.; the "Tatum Spotlight" by Tatum Light; the chair disclosed in U.S. Pat. No. 4,746,167 to Palmer (1988); and the chair disclosed in my U.S. Pat. No. 4,971,040 (1990). The non-adjustable supports may not fit most users, so that these chairs may be uncomfortable.

The "Porto Pro" massage chair by Oakworks, Inc. provides a height adjustable chest support. It includes a seat and a chest support attached to the top ends of a pair of scissoring arms, the bottom ends of which serve as legs of the chair. When the arms are opened, the seat and chest support are lowered, and when the arms are closed, the seat and chest support are raised. However, the angle of the chest support is fixed relative to the arm it is mounted on, so that it is not adjustable to fit different users. Furthermore, closing the arms to raise the seat and chest support also moves the legs closer together, so that the chair becomes less stable.

Although some chairs include face supports that are adjustable in tilt, their pivot points are fixed relative to the chest support, so that they may be positioned too far forward or backward relative to the plane of the chest support for some users. Most chairs also have structural members awkwardly positioned between the chest and leg supports, so that a user must mount the chair by swinging one leg over the seat in the same manner as mounting a bicycle, which would be embarrassing for women wearing skirts or dresses. Furthermore, all prior art chairs include arm supports that are fixed in distance from the chest supports, and chest supports that are fixed in distance from the face supports, so that such chairs may not fit all users.

OBJECTS OF THE INVENTION

Accordingly the primary object of the present invention is to provide a massage chair with a seat, a chest support, an arm support, and a face support that are all adjustable in height to fit different users.

Another object of the present invention is to provide a massage chair with a seat and a chest support that are independently adjustable in height to fit different users.

Another object of the present invention is to provide a massage chair with a seat, a chest support, an arm support, and a face support that are all independently adjustable in tilt to fit different users.

Another object of the present invention is to provide a massage chair with an arm support that is adjustable in distance from the chest support to fit different users.

Another object of the present invention is to provide a massage chair with a chest support and a face support that are slidably adjustable together as well as independently tilt adjustable to fit different users.

Another object of the present invention is to provide a massage chair with a face support that is adjustable fore-and-aft relative to the plane of the chest support to fit different users.

Another object of the present invention is to provide a massage chair with a pair of clamps that secure a pair of telescoping arms of the chair's frame in their selected positions.

Yet another object of the present invention is to provide a massage chair that is collapsible into a compact position for convenient transportation and storage.

Further objects of the present invention will become apparent from a consideration of the drawings and ensuing description.

BRIEF SUMMARY OF THE INVENTION

An adjustable massage chair includes a stationary arcuate arm, and front and rear arcuate arms telescopically extending from the front and rear ends, respectively, of the stationary arcuate arm. A chest support is hingeably attached to an outer end of the front arcuate arm, and a seat is hingeably attached to the outer end of the rear arcuate arm. The height of the chest support and seat are independently adjustable by sliding the front and rear arms, respectively, in or out of the stationary arm, and locking the front and rear arms in their selected positions with a pair of clamps positioned at the ends of the stationary arcuate arm. An arm support is hingeably attached to the lower side of the chest support, and a leg support is positioned between the chest support and the stationary arcuate arm. A face support is hingeably attached to the top edge of the chest support. The hinged supports are all independently adjustable in tilt. The pivot for the face support is positioned through a pair of slots on a pair of L-shaped arms attached to the face support, so as to enable the face support to be adjusted fore-and-aft relative to the plane of the chest support. The face support and the chest support are also slidably adjustable together relative to the end of the front arcuate arm. Thus the present massage chair includes a multitude of adjustments for fitting different users, and for supporting them in a variety of positions for receiving a massage on different parts of their bodies.

DRAWING REFERENCE NUMERALS

DRAWING REFERENCE NUMERALS

| | |
|---|---|
| 10. Telescoping Frame | 11. Front Arcuate Arm |
| 12. Rear Arcuate Arm | 13. Stationary Arcuate Arm |
| 14. Legs | 15. Clamp |
| 16. Clamp | 17. Leg Support |
| 18. Chest Support | 19. Pad |
| 20. Sliding Upper Panel | 21. Hinged Lower Panel |
| 22. Locking Arm | 23. Arm Support |
| 24. Pad | 25. Arm |
| 26. Brackets | 27. Pin |
| 28. Releasable Strap | 29. Arrows |
| 30. Removable Sleeve | 31. Face Support |
| 32. Pad | 33. Face Support Panel |
| 34. L-Shaped Arms | 35. Clamps |
| 36. bar | 37. Slots |
| 38. Seat | 39. Pad |
| 40. Bracket | 41. Arm |
| 42. Holes | 43. Releasable Strap |
| 44. Notch | 45. Notch |
| 46. U-Shaped Rails | 47. L-shaped Member |
| 48. Blocks | 49. Blocks |
| 50. Pivot | 51. Lever |
| 52. Bar | 53. Brackets |
| 54. Clamping Members | 55. Flat Sides |
| 56. Semicircular Gripping Surfaces | 57. Flat Portion |
| 58. First Ends | 59. Second Ends |
| 60. Bolts | 61. Flange |
| 62. Bolts | 63. Tension Bolt |
| 64. Nut | 65. Lever |
| 66. Pivot | 67. Tapered End |
| 68. Arrow | 69. Arrows |
| 70. Arrows | 71. Holes |
| 72. Arrows | 73. Arrows |
| 74. Pin | 75. Arrows |
| 76. Arrows | 77. U-Shaped Rails |
| 78. Pivot | 79. Clamp |
| 80. U-Shaped Gripping Member | 81. U-Shaped Gripping Member |
| 82. Bolts | 83. Bolts |
| 84. Slots | 85. Semi-Circular Inner Gripping Surfaces |
| 86. Flat Portions | 87. U-Bolt |
| 88. Arms Of U-Bolt | 89. Opposite Ends |
| 90. Opposite Ends | 91. Nuts |
| 92. Lever | 93. Flat Intermediate Outer Portion |
| 94. Hole | |

DETAILED DESCRIPTION OF THE INVENTION

Figure 1:
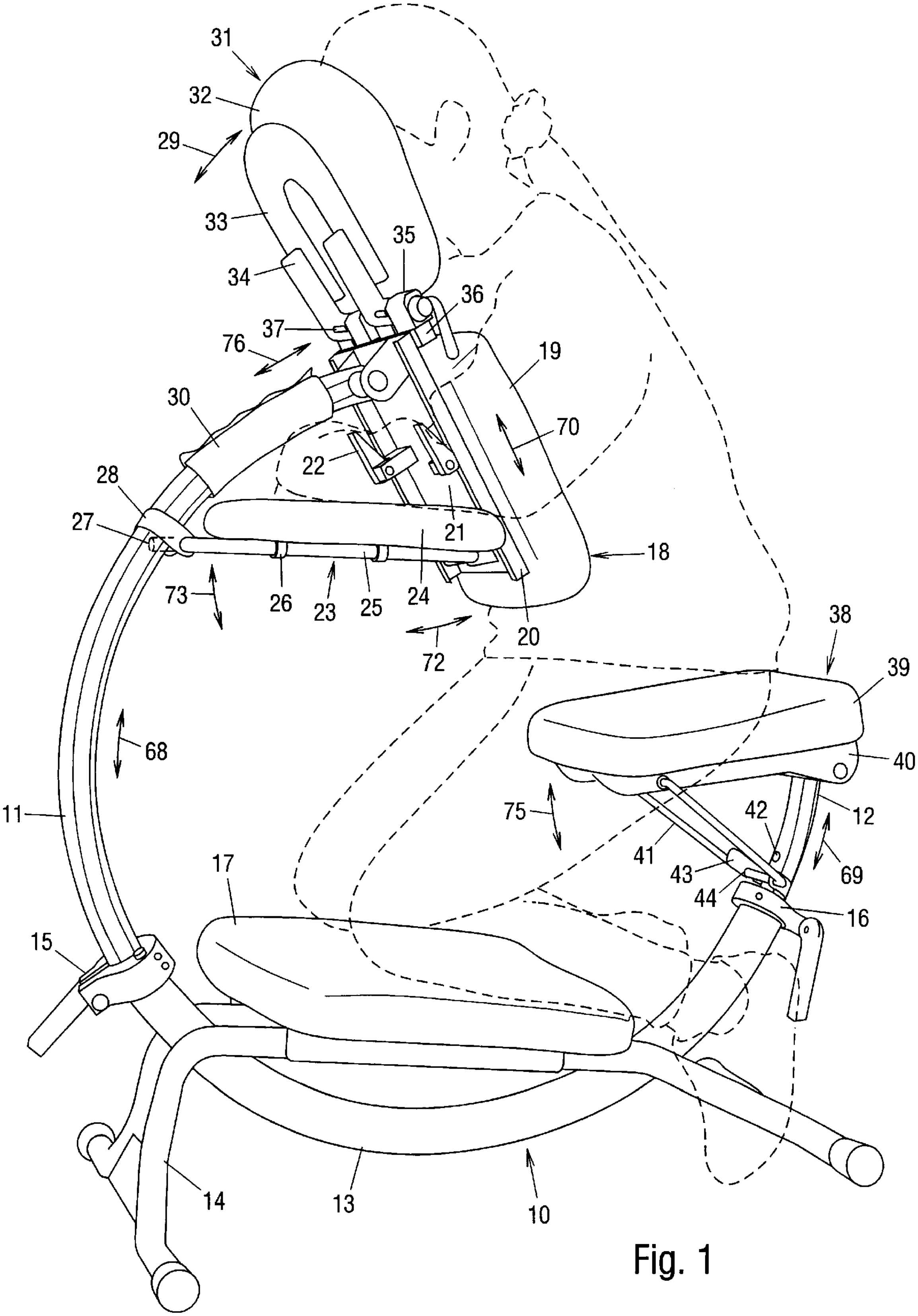
FIG. 1 is a left side perspective view of an adjustable massage chair in accordance with a preferred embodiment of the invention.

FIG. 1:

In accordance with a preferred embodiment of the invention shown in the left side perspective view of FIG. 1, an adjustable massage chair includes a telescoping frame 10 having movable front and rear tubular arcuate arms 11 and 12, respectively, extending telescopically from the front and rear ends, respectively, of a stationary arcuate tubular arm 13, which is fixedly attached to a set of legs 14. The diameters of the arms are sized so that front arcuate arm 11 is slidably positioned within stationary arcuate arm 13, and rear arcuate arm 12 is slidably positioned within stationary arcuate arm 13 and front arcuate arm 11, so that they are slidable in and out of the respective ends of stationary arcuate arm 13, as indicated by arrows 68 and 69. Front arcuate arm 11 and rear arcuate arm 12 are long enough to overlap each other at their inner ends even when they are fully extended from stationary arcuate arm 13. A pair of clamps 15 and 16 are fixedly and concentrically attached to the ends of stationary arcuate arm 13. Clamps 15 and 16 may be loosened to allow adjustments in the height of front and rear arcuate arms 11 and 12, respectively, and they may be tightened to secure the arms in their selected positions. A padded leg support 17 is fixedly attached to the top of legs 14.

A chest support 18 is hingeably attached to the outer end of front arcuate arm 11. Chest support 18 includes a pad 19 attached to an upper sliding panel 20, which is slidably attached to a lower hinged panel 21, which in turn has an upper or forward end hingeably attached to the outer end of front arcuate arm 11. A pair of locking arms 22 are attached to lower hinged panel 21 for tightening upper sliding panel 20 in a selected position, so that pad 19 may be slidably positioned, as indicated by arrows 70, to fit different users. The sliding adjustment of chest support 18 and the operation of locking arms 22 will be further explained in conjunction with FIGS. 6 and 7.

Figure 8:
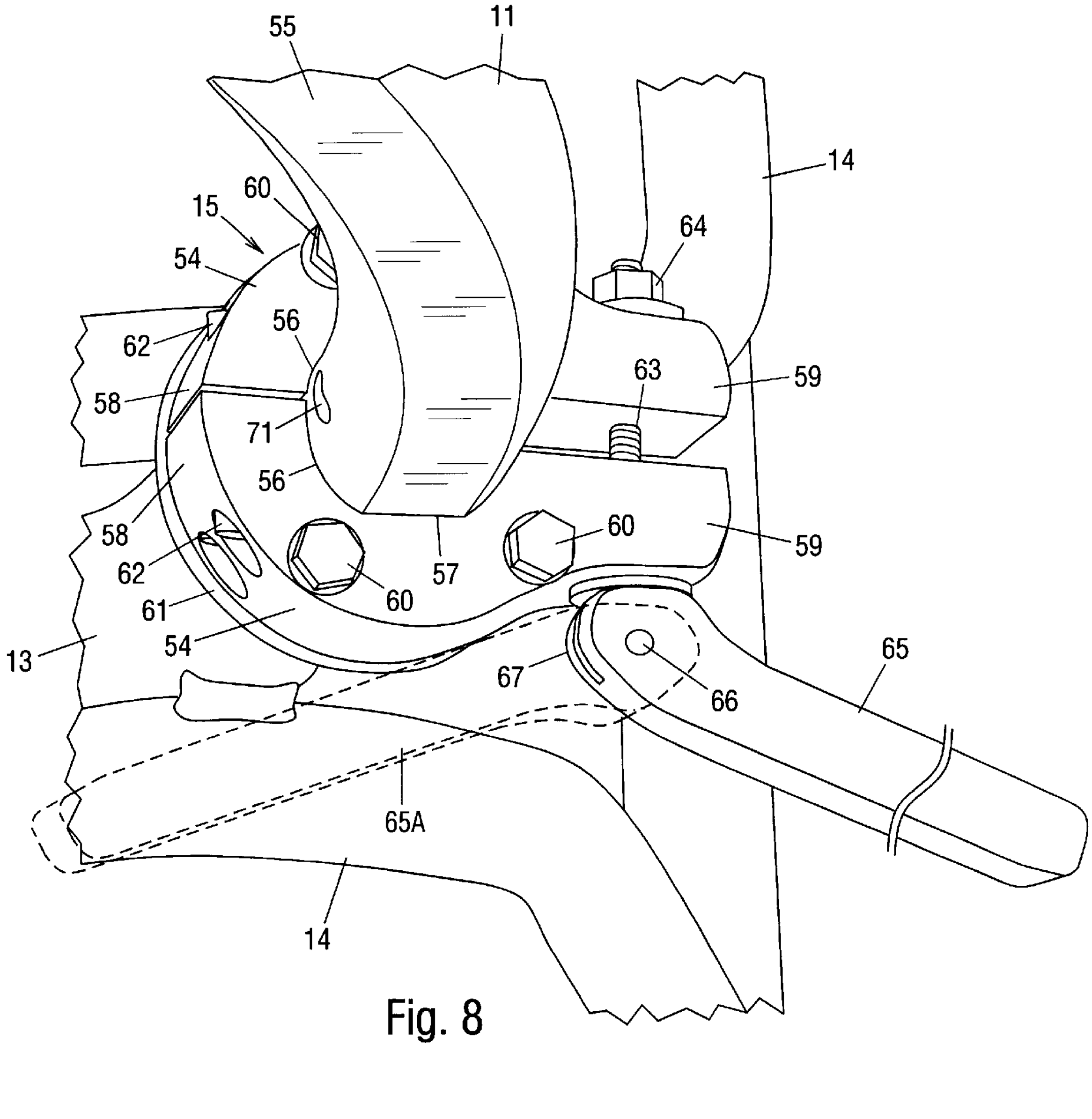
FIG. 8 is a top perspective view of a clamp for the telescoping frame of the adjustable massage chair, as seen from the right side of the chair.

An arm support 23 includes a pad 24 slidably mounted on top of an arm 25 by brackets 26. Arm 25 has a rear end hingeably attached to a lower end of lower hinged panel 21. A pin 27 extending from the front end of arm 25 is positioned in one of a series of holes 71 (FIG. 8) arranged along the inner side of front arcuate arm 11. The angle of chest support 18 and arm support 23 may be adjusted, as indicated by arrows 72 and 73, respectively, by positioning pin 27 in a suitable hole 71 (FIG. 8) along front arcuate arm 11. E.g., chest support 18 and arm support 23 may be simultaneously tilted higher or lower by positioning pin 27 in a higher or lower hole 71 (FIG. 8). A releasable strap 28 secures arm 25 on front arcuate arm 11, and ensures that pin 27 will not accidentally disengage therefrom. A removable sleeve 30 is positioned around the top portion of front arcuate arm 11 as a comfort liner.

A face support 31 is hingeably attached to the top edge of chest support 18. Face support 31 includes a U-shaped pad 32 attached to the top surface of a U-shaped face support panel 33. A pair of L-shaped arms 34 are attached to the bottom surface of panel 33 and extend toward chest support 18. The distal ends of L-shaped arms 34 are held in a pair of clamps 35, which are attached to a bar 36, which is in turn attached to the top surface of upper sliding panel 20. Clamps 35 include bolts 50 (FIG. 6) that extend through slots 37 on L-shaped arms 34. Slots 37 are elongated in a direction that is substantially normal to the plane of panel 33. When clamps 35 are loosened, face support 31 may be adjusted in tilt, as indicated by arrows 29, and also fore-and-aft relative to the plane of chest support 18, as indicated by arrows 76. Clamps 35 may be tightened to lock L-shaped arms 34 and secure face support 31 in its selected position. When chest support 18 is slidably adjusted along lower hinged panel 21, face support 31 is also adjusted simultaneously because it is attached to upper sliding panel 20.

A buttock support or seat 38 is hingeably attached to the outer end of rear arcuate arm 12. Seat 38 includes a pad 39 attached to a bracket 40, which has a rear end pivotally attached to rear arcuate arm 12. A U-shaped arm 41 has the ends of the "U" pivotally attached the front end of bracket 40. A pin 74 (FIG. 4) extending from the bottom of the "U" is inserted to one of a series of holes 42 (one shown) arranged along the inner side of rear arcuate arm 12. The pin may be positioned in different holes 42 to adjust the tilt of seat 38, as indicated by arrow 75. A strap 43 wrapped around rear arcuate arm 12 has one end fixedly attached to arm 41, and another end with a notch 44 removably attached to arm 41, so that strap 43 may be released for adjusting seat 38, and reattached after seat 38 is adjusted to secure arm 41 on rear arcuate arm 12.

The open space in front of seat 38 provided by arcuate arms 11 and 13 enables a user to easily mount seat 38 by passing one leg over leg support 17, without having to raise the leg in the manner required by most prior art massage chairs. Except for arm pad 24, all other support pads are mounted by hook-and-loop fasteners to enable additional positional adjustments, and to enable them to be easily removed for cleaning or replacement. The multitude of adjustments provided by the movable supports enable the chair to fit different users perfectly, and to position them in a variety of positions for receiving a massage to different parts of their bodies.

Figure 2:
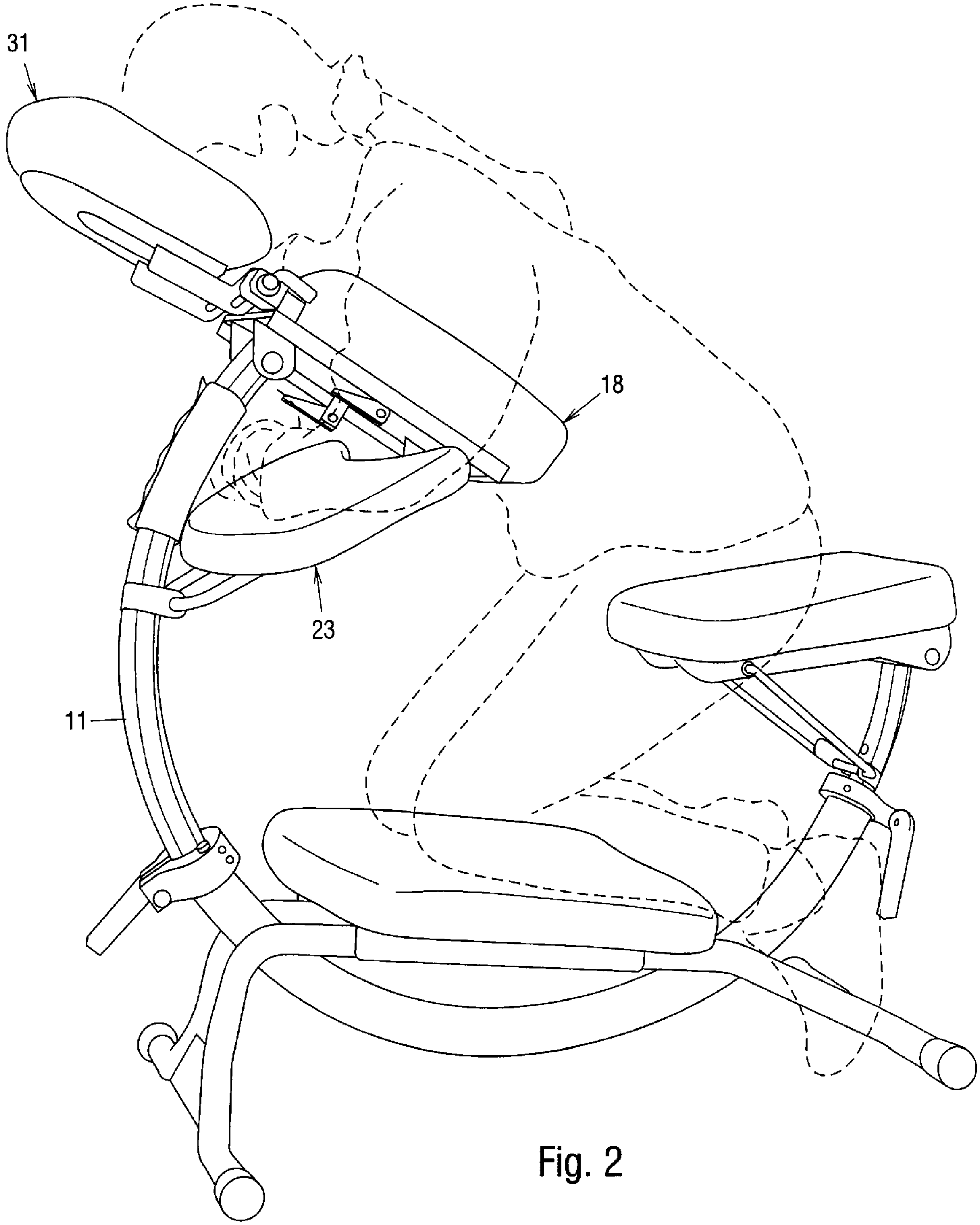
FIG. 2 is a left side perspective view of the adjustable massage chair in another position.
Figure 3:
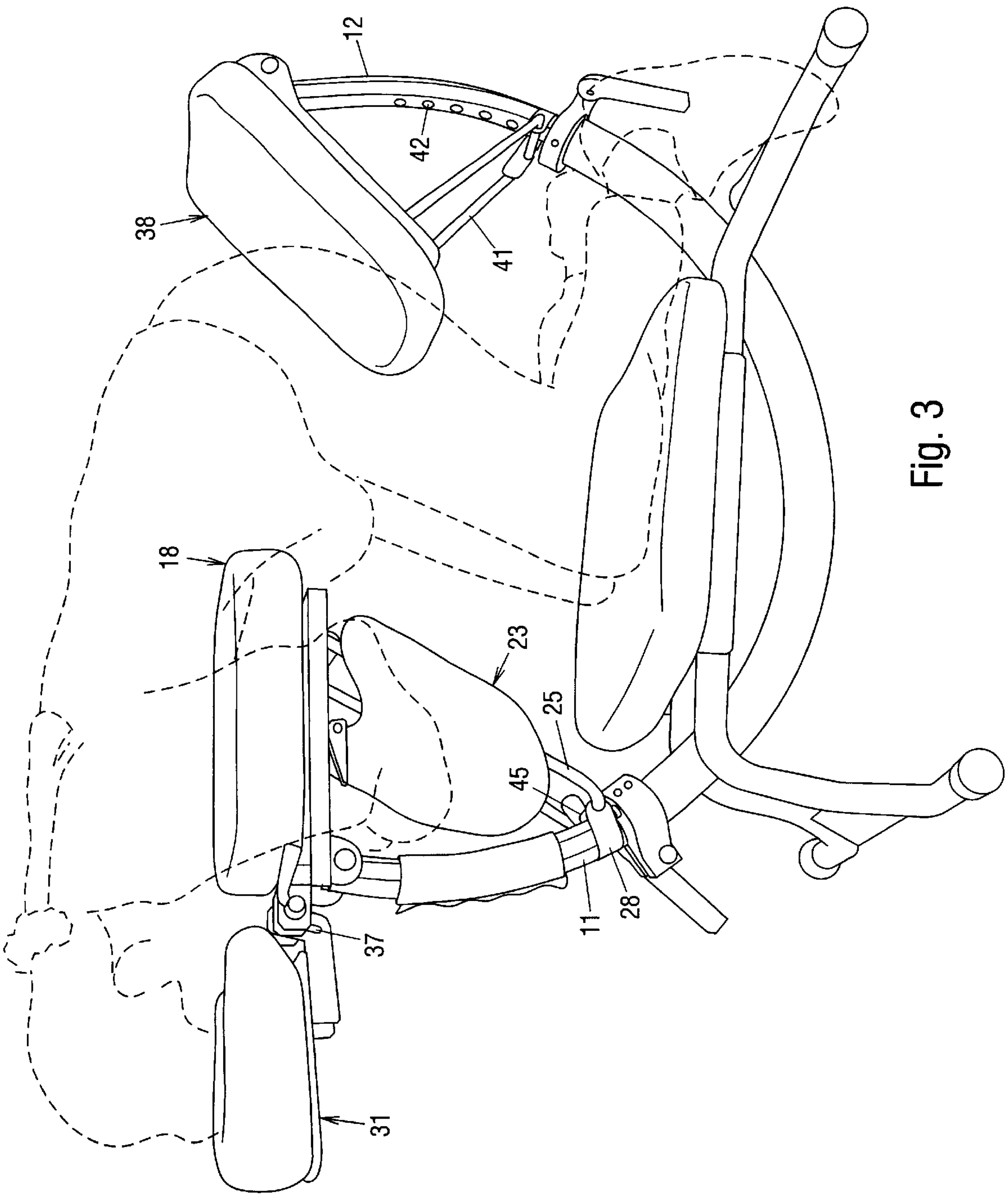
FIG. 3 is a left side perspective view of the adjustable massage chair in yet another position.

FIGS. 2 and 3:

The adjustable massage chair is shown in FIGS. 2 and 3 in other positions. In FIG. 2, front arcuate arm 11 is partially retracted to lower face support 31, chest support 18, and arm support 23 to position the user in a more inclined position. In FIG. 3, front arcuate arm 11 is further retracted to further lower face support 31, chest support 18, and arm support 23 to position the user in an even more inclined position. Strap 28 includes a notch 45 arranged at one end for releasably attaching to arm 25. Rear arcuate arm 12 is partially extended to raise seat 38, and arm 41 is pivoted to a lower position by inserting pin 74 (FIG. 4) in a lower hole 42 to increase the tilt of seat 38 for a more comfortable fit.

Figure 4:
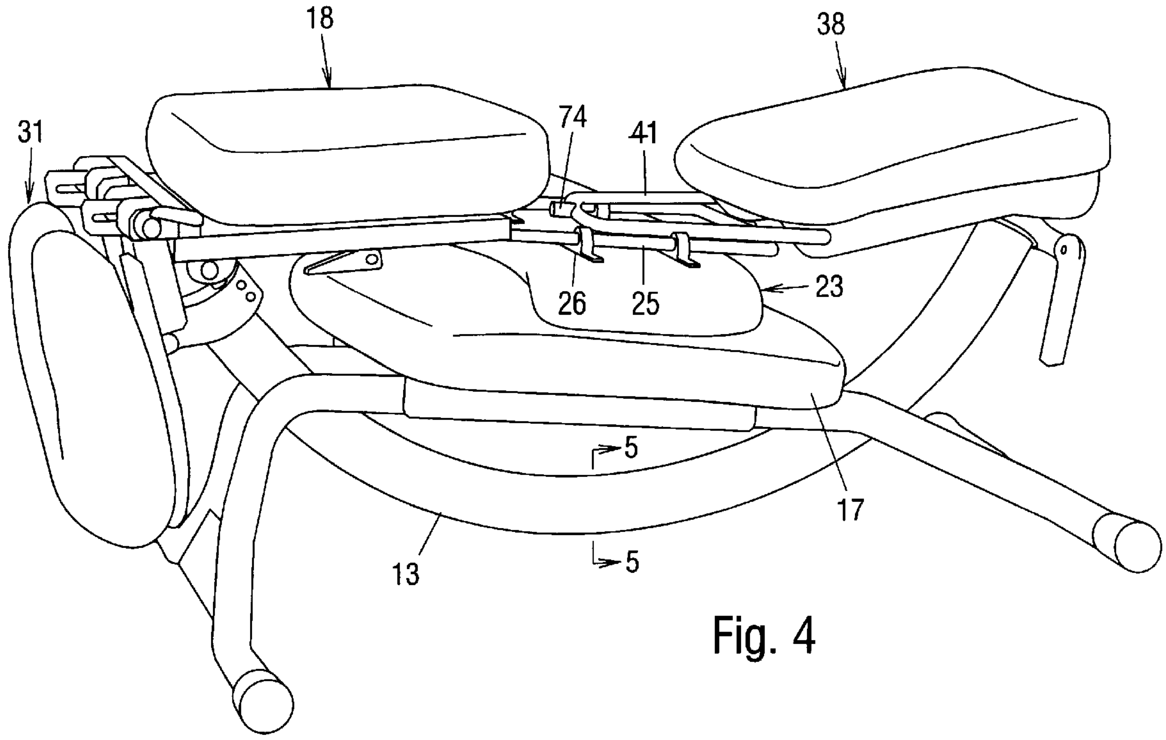
FIG. 4 is a left side perspective view of the adjustable massage chair in a collapsed position.

FIG. 4:

The adjustable massage chair is shown in a collapsed position in FIG. 4. The chair is collapsed by first removing sleeve 30 (FIG. 1). The distal end of arm 25 is then disengaged from front arcuate arm 11 (FIG. 1), and arm support 23 is pivoted backwardly until it is parallel with chest support 18. Both arm support 23 and chest support 18 are pivoted upwardly until they are parallel with leg support 17, then front arcuate arm 11 (FIG. 1) is retracted into stationary arcuate arm 13. Next, the distal end of arm 41 is disengaged from rear arcuate arm 12 (FIG. 1), and pivoted forwardly until it is about parallel with seat 38, then rear arcuate arm 12 (FIG. 1) is fully retracted into stationary arcuate arm 13. A pin 74 extends from the end of arm 41 for being positioned in a hole 42 (FIG. 1) along rear arcuate arm 12 (FIG. 1) when seat 38 is in use.

Figure 5:
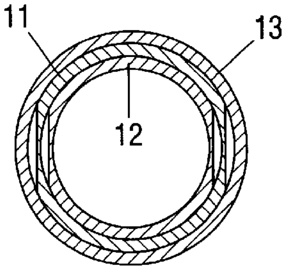
FIG. 5. is a sectional view of a telescoping frame of the adjustable massage chair, taken along line 5—5 in FIG. 4.

FIG. 5:

As shown in the sectional view in FIG. 5, rear arcuate arm 12 is sized to slidably fit within front arcuate arm 11, which is sized to slidably fit within stationary arcuate arm 13. Front arcuate arm 11 and rear arcuate arm 12 are long enough to overlap each other even when they are fully extended.

Figure 6:
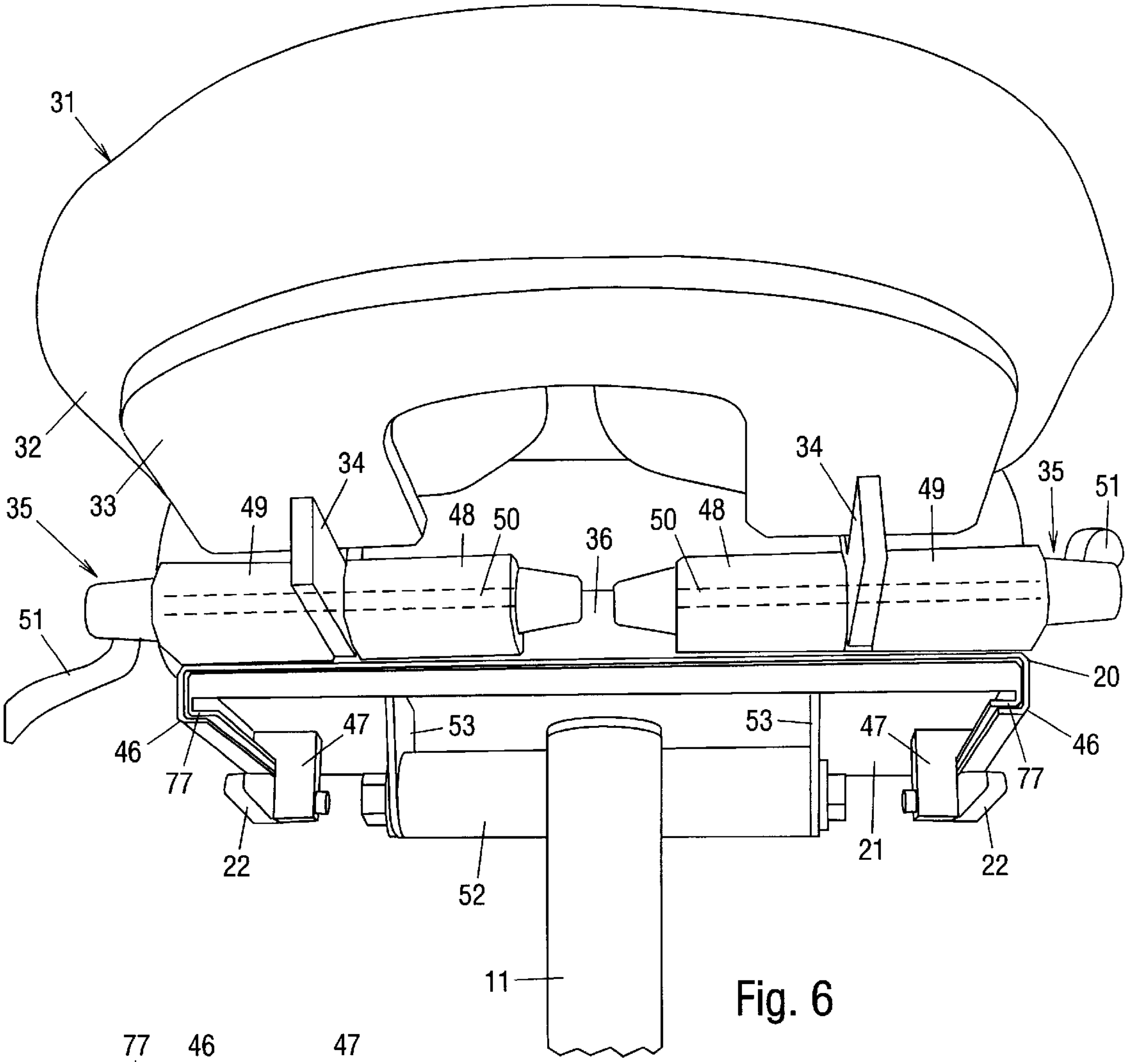
FIG. 6 is front perspective view of a face support and chest support of the adjustable massage chair.

FIG. 6:

As shown in the front perspective view in FIG. 6, upper sliding panel 20 includes U-shaped rails 46 arranged along opposite sides thereof. Hinged lower panel 21 also includes U-shaped rails 77 arranged along opposite sides thereof. Rails 77 are positioned within rails 46, so that upper sliding panel 20 is slidable along hinged lower panel 21. A pair of L-shaped members 47 each include a horizontal portion positioned within a rail 77, and a downwardly extending vertical portion pivotally attached to a locking arm 22, so that the horizontal portions of rails 46 and 77 are positioned between locking arm 22 and the horizontal portion of L-shaped member 47. Locking arms 22 are shown in a locked position that maintains upper sliding panel 20 in a selected position along hinged lower panel 21. Locking arms 22 may be lowered to an unlocked position to allow upper sliding panel 20 to be slidably adjusted along hinged lower panel 21, and they may be raised and locked to secure upper sliding panel 20 in a new position.

Clamps 35 each include two blocks 48 and 49 attached to bar 36, which is attached to the top surface of upper sliding panel 20. Blocks 48 and 49 are positioned on either side of L-shaped arms 34. Each clamp 35 also includes a pivot 50 positioned through blocks 48 and 49, and slot 37 (FIG. 1) on a respective L-shaped arm 34. A lever 51 at one end of each clamp 35 enables it to be tightened or loosened around a respective L-shaped arm 34. Clamps 35 are conventional and readily available items.

The top of front arcuate arm 11 is attached to hinged lower panel 21 by a horizontal bar 52 that is pivotally attached between a pair of brackets 53 extending from the lower side of hinged lower panel 21.

Figure 7:
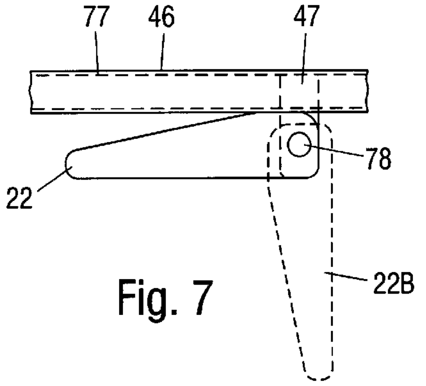
FIG. 7 is a side view of a locking arm of the adjustable massage chair.

FIG. 7:

As shown in the left side view in FIG. 7, rails 46 and 77 are tightly clamped between locking arm 22 and the horizontal portion of L-shaped member 47. The proximal end of locking arm 22 is pivotally attached to the lower end of L-shaped member 47 by a pivot 78, which is offset toward the proximal end of arm 22. When locking arm 22 is rotated downwardly, it is disengaged from rail 46, so that rail 46 may be slidably positioned relative to rail 77.

FIG. 8:

As shown in the top perspective view in FIG. 8, from the right side of the chair, clamp 15 includes a pair of opposite gripping members 54 positioned on either side of front arcuate arm 11, which includes opposite flat sides 55 (one shown) extending longitudinally thereon. Gripping members 54 are made of a slightly flexible plastic, such as "Delrin", and flat sides 55 are knurled for friction. Gripping members 54 include inwardly facing, semicircular gripping surfaces 56 with flat portions 57 (one shown), so as to closely follow the circumference of front arcuate arm 11. Flat sides 55 on front arcuate arm 11 cooperate with flat portions 57 on gripping members 54 to prevent front arcuate arm 11 from rotating about its axis.

Gripping members 54 also include first and second ends 58 and 59, respectively. Second ends 59 are elongated, so that they extend away from front arcuate arm 11. One gripping member 54 is attached by a single bolt 60, which is positioned adjacent first end 58, to a flange 61 fixedly attached to the end of stationary arcuate arm 13. The other gripping member 54 is attached by two bolts 60 spaced evenly thereon to flange 61. Bolts 60 are inserted through holes (not shown) in gripping members 54 that are somewhat larger than bolts 60 to permit some lateral movement. First ends 58 of gripping members 54 are directly tied together by a pair of bolts 62 that extend therebetween. Second ends 59 of gripping members 54 are also tied together by a tension bolt 63 that extends completely therethrough. One end of bolt 63 is secured by a nut 64, and the other end (not shown) is secured by a lever 65 hingeably connected thereto by a pivot 66, which is positioned off-center in a tapered end 67 of lever 65. Tapered end 67 includes a rounded tip to enable lever 65 to be pivoted smoothly against a gripping member 54. A series of holes 71 (one shown) are arranged along the inside of front arcuate arm 11 for receiving pin 27 (FIG. 1) at the front end of arm 25 (FIG. 1).

Clamp 15 is adjusted by adjusting bolts 62 so that semicircular gripping surfaces 56 are in close contact with front arcuate arm 11. Lever 65 is placed in the position shown by the solid lines. Nut 64 is adjusted so as to tighten seconds ends 59 of gripping members 54 enough to securely grip front arcuate arm 11. Thus adjusted, clamp 15 may be loosened to allow sliding movement of front arcuate arm 11 by moving lever 65 to the position shown in dashed lines, and it may be tightened again to secure front arcuate arm 11 in a selected position by moving lever 65 back to the position shown in solid lines. I.e., clamp 15 is loosened or tightened by applying tension between the elongated second ends 59 of gripping members 54. Clamp 16 (FIG. 1) is substantially identical to clamp 15, except for size differences necessary for fitting around the smaller rear arcuate arm 12 (FIG. 1), which also includes flat sides that extend longitudinally thereon for preventing it from rotating.

Figure 9:
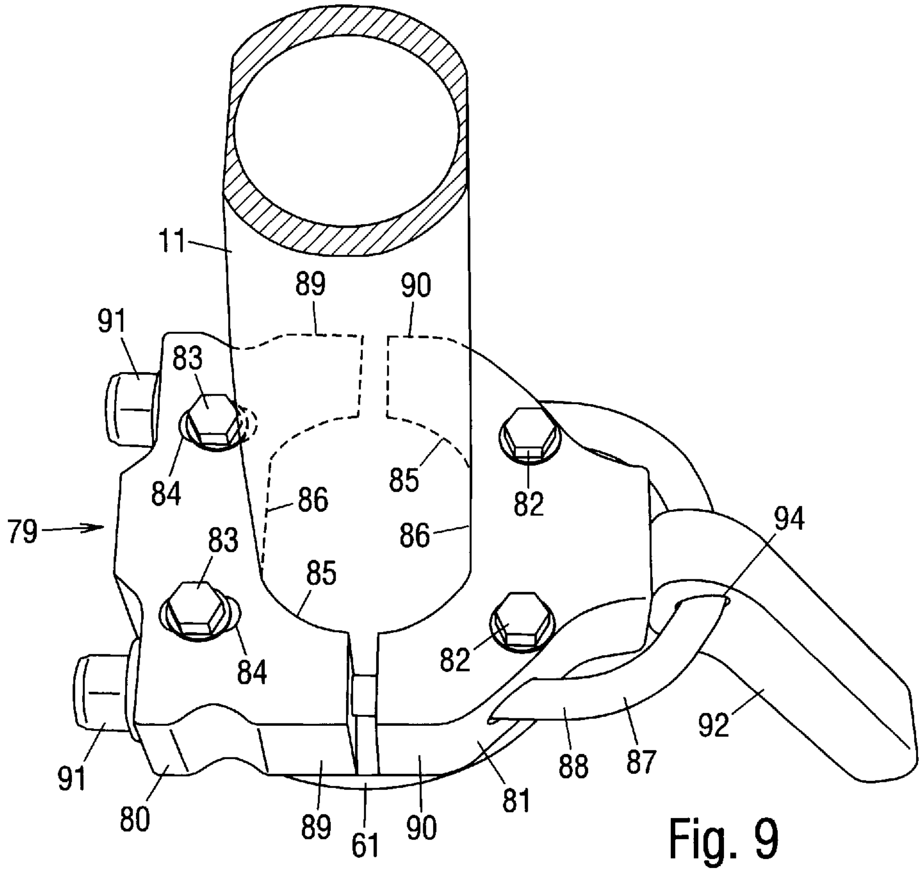
FIG. 9 is a top perspective view of an alternative clamp, as seen from the rear of the chair, in a locked condition.
Figure 10:
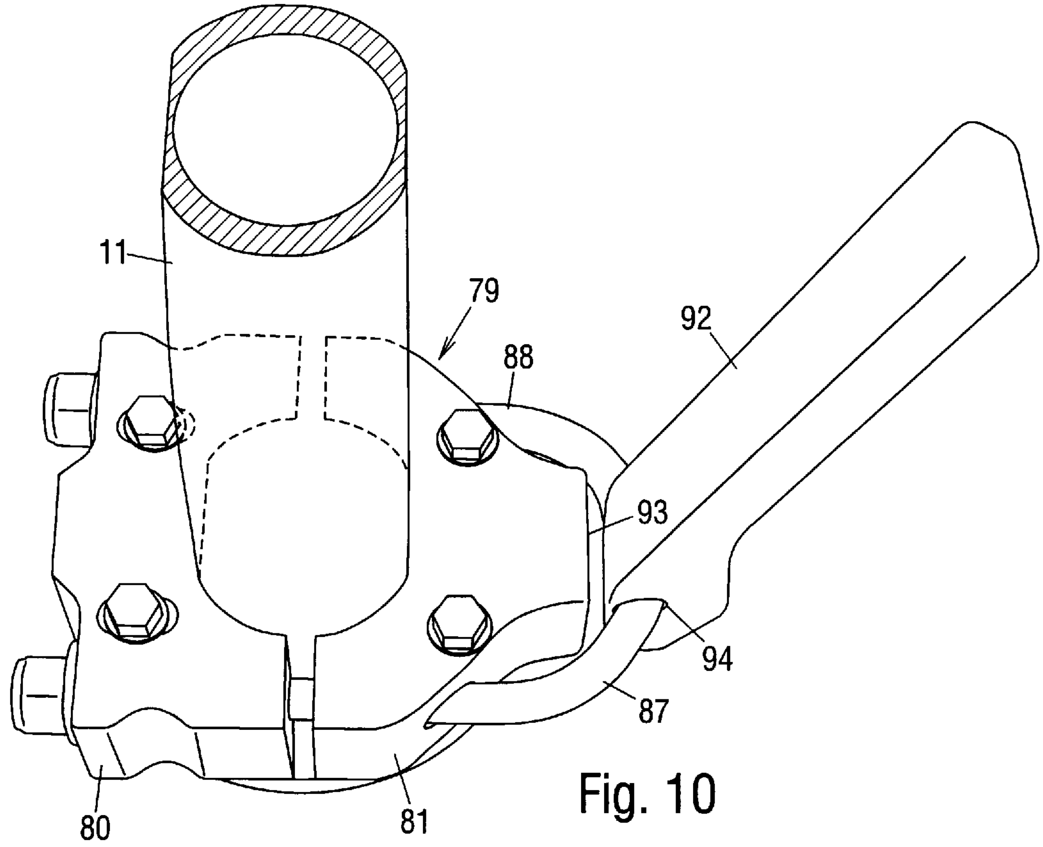
FIG. 10 is a top perspective view of the clamp of FIG. 9 in an unlocked condition.

FIGS. 9 and 10:

As shown in the top perspective rear view in FIG. 9, an alternative locking clamp 79 includes two opposite, generally U-shaped, first and second gripping members 80 and 81, respectively, positioned around arcuate arm 11. Gripping member 81 is fixedly attached to flange 61 at the end of stationary arcuate arm 13 (FIG. 1) by a pair of bolts 82 extending snugly therethrough. Gripping member 80 is attached to flange 61 by a pair of bolts 83 extending loosely through a pair of slots 84 on gripping member 80, so that gripping member 80 is horizontally slidable by a small amount. Gripping members 80 and 81 each includes a semi-circular inner gripping surface 85 with a flat portion 86, so as to closely follow the circumference of arcuate arm 11. A U-bolt 87 includes arms 88 extending slidably and parallelly through opposite ends 89 and 90 of gripping members 80 and 81, respectively. The threaded distal ends (not shown) of arms 88 are retained by nuts 91. A lever 92 includes a hole 94 at a proximal end thereof pivotally positioned around the intermediate portion of U-bolt 87. The proximal end of lever 92 has a substantially identical contour as that of lever 65 (FIG. 8). Hole 94 is offset on lever 92 similarly as pivot 66 (FIG. 8).

Clamp 79 is initially adjusted by positioning lever 92 in the locked position, which in this example is the down position, and tightening nuts 91 until gripping members 80 and 81 are tightened around arcuate arm 11. Arcuate arm 11 can be released by rotating lever 92 to the up position, as shown in FIG. 10, so that the proximal end of lever 92 is disengaged from a flat intermediate outer portion 93 of gripping member 81. U-bolt 87 is thus freed to slide inwardly against gripping member 81, and gripping member 80 is released from tight contact with arcuate arm 11, so that arcuate arm 11 is slidable for height adjustment.

SUMMARY AND SCOPE

Accordingly, I have provided a massage chair that includes a multitude of adjustments for fitting virtually all users in a great variety of different positions for receiving a massage to different parts of their bodies. It includes a seat, a chest support, an arm support, and a face support that are all height adjustable. The seat and chest support are independently adjustable in height. The seat, chest support, arm support, and face supports are all independently adjustable in tilt. The chest support and face support are also slide adjustable together relative to the front arcuate arm on which they are supported. The arm support is also slide adjustable along its mounting arm. In addition to tilt, the face support is further adjustable fore-and-aft relative to the plane of the chest support. The chair includes a pair of clamps for securing the front and rear arcuate arms that support the chest support and seat, respectively. The clamps prevent the arcuate arms from rotating about their longitudinal axes, and are easily operated for tightening or loosening the arms.

Although the above descriptions are specific, they should not be considered as limitations on the scope of the invention, but only as examples of the embodiments. Many other ramifications and variations are possible within the teachings of the invention. For example, gripping members 54 can be made of materials other than "Delrin." Tension bolt 63 and lever 65 may be replaced with other types of tensioning devices, such as a tension spring. Other types of legs 14 may be used for supporting frame 10 in an upright position. Adjustable face support 31 and clamps 35 may be attached to a massage table. Clamps 15 and 16 may be used in other applications for gripping other objects. Instead of being tubular and telescoping within one another, the arcuate arms may be laterally positioned and slidably attached together. Instead of being U-shaped, rails 46 and 77 may be L-shaped, i.e., they may include only a vertical portion extending downwardly from their respective panels, and locking arms 22 may be oriented to clamp onto the vertical portion. Rails 46 and 77 may even be eliminated, and locking arms 22 may be oriented to clamp onto the side edges of panels 20 and 21, which may be slidably connected by small tabs extending from the edges of panel 20 that wrap around the edges of panel 21. In the alternative clamp, gripping member 80 may be fixed on flange 61, and gripping member 81 may be slidable. Adjustable nuts 91 may be eliminated, and the distal ends of U-bolt 92 may be bonded or otherwise fixed in first gripping member 80. Therefore, the scope of the invention should be determined by the appended claims and their legal equivalents, not by the examples given.

I claim:

1. A clamp, comprising:

a first tube;

a second tube telescopically extending from an end of said first tube;

a flange attached around a rim at said end of said first tube;

laterally positioned first and second gripping members attached to a face of said flange and positioned in contact with opposite sides of said second tube, each of said gripping members having opposite ends;

a U-bolt having an intermediate portion connecting a pair of parallel arms, each of said parallel arms extending through adjacent ends of said gripping members, each of said parallel arms having a distal end attached to said first gripping member, said second gripping member being positioned between said intermediate portion of said U-bolt and said first gripping member, said U-bolt being slidable through said second gripping member; and a lever having a hole positioned off-center in a tapered proximal end thereof, said hole being positioned around said intermediate portion of said U-bolt, said lever being pivoted only about said intermediate portion of said U-bolt, said lever being rotatable to a locked position in which said tapered proximal end is pressed against said second gripping member, so that said second tube is tightly gripped between said gripping members, said lever being rotatable to an unlocked position in which said tapered proximal end is disengaged from said second gripping member, so as to release said gripping members from gripping said second tube.

2. The clamp of claim 1, further including a flat intermediate outer portion on said second gripping member engaging said proximal end of said lever.

3. A clamp, comprising:

a first tube;

a second tube telescopically extending from an end of said first tube;

a flange attached around a rim at said end of said first tube;

laterally positioned first and second gripping members attached to a face of said flange and positioned in contact with opposite sides of said second tube, each of said gripping members having opposite ends, said first gripping member having a plurality of slots, said second gripping member having a flat intermediate outer portion;

a plurality of first straight bolts extending through said slots on said first gripping member and secured to said flange, said slots being wider than said first straight bolts so that said first gripping member is movable perpendicularly to said second tube;

a plurality of second straight bolts fixedly securing said second gripping member to said flange;

a U-bolt comprising an intermediate portion connecting a pair of parallel arms, each of said parallel arms extending through adjacent ends of said gripping members, each of said parallel arms having a distal end attached to said first gripping member, said second gripping member being positioned between said intermediate portion of said U-bolt and said first gripping member, said U-bolt extending through a pair of channels in said second gripping member narrow enough to restrict said U-bolt to a perpendicular position relative to said first tube; and a lever having a hole positioned off-center in a tapered proximal end thereof, said intermediate portion of said U-bolt being positioned through said hole in said lever, said lever being pivoted only about said intermediate portion of said U-bolt, said lever being rotatable to a locked position in which said tapered proximal end is pressed against said flat intermediate outer portion of said second gripping member, said flat intermediate outer portion providing stability to said lever, so that said second tube is tightly gripped between said gripping members, said lever being rotatable to an unlocked position in which said tapered proximal end is disengaged from said second gripping member, so as to release said gripping members from gripping said second tube.

* * * * *